UNITED STATES PATENT OFFICE.

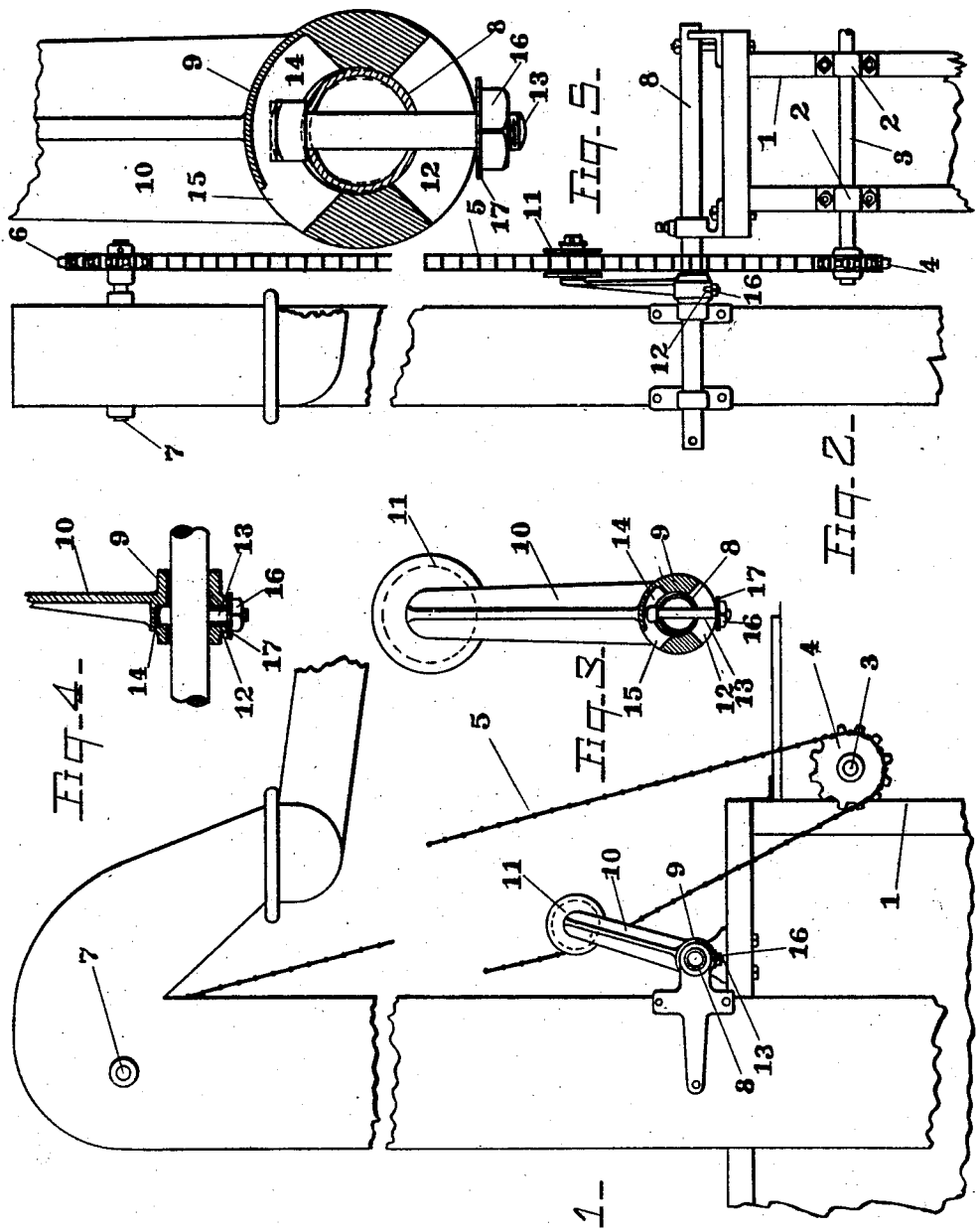

THOMAS S. COURTNEY, OF EAST MOLINE, ILLINOIS, ASSIGNOR TO MARSEILLES COMPANY, OF EAST MOLINE, ILLINOIS, A CORPORATION OF ILLINOIS.

CHAIN-TIGHTENER.

1,275,398.  Specification of Letters Patent.  Patented Aug. 13, 1918.

Application filed November 22, 1916. Serial No. 132,788.

*To all whom it may concern:*

Be it known that I, THOMAS S. COURTNEY, a citizen of the United States, residing at East Moline, in the county of Rock Island and State of Illinois, have invented certain new and useful Improvements in Chain-Tighteners, of which the following is a specification, reference being had therein to the accompanying drawing.

My invention relates to that class of devices known as chain tighteners, and has for its object the construction of a tightener, both economical and effective, which can be readily adjusted and securely held in position to preserve a proper tension in a chain to which it is applied.

Referring to the drawings in which similar numerals indicate identical parts—

Figure 1 is a side view in part of a grain elevator showing the application of my device.

Fig. 2 is an end elevation of Fig. 1.

Figs. 3, 4, and 5 are sectional details.

I have illustrated my device as utilized to tighten the driving chain of an elevator, but it is obvious that it is applicable to a chain wherever employed. The part of an elevator shown includes a frame 1 having bearings 2 thereon in which is journaled a shaft 3 projecting beyond the frame and carrying rigidly mounted thereon a sprocket 4. A sprocket chain 5 on the sprocket passes over a similar sprocket 6 rigidly mounted on a shaft 7 journaled in suitable bearings on the elevator; it is supposed that the shaft 3 is a power shaft operated by a source of power, and through the sprockets 4 and 6 and the chain 5, conveys power to the elevator mechanism.

On the top of the frame 1 is rigidly supported a shaft 8, which is preferably tubular and forms one of the supports for the elevator. On the shaft 8 I mount my device which includes a sleeve 9 through which the shaft 8 extends. Projecting from the sleeve 9, and preferably integral therewith, is an arm 10 on the free end of which is mounted, to freely rotate, a roller 11. The tightener is adjustably secured on the shaft 8 in the following manner. A slot 12 is formed circumferentially, in the sleeve 9 and is of sufficient width to permit the free passage of a bolt 13 therethrough. Opposite the slot 12 is a similar slot 14 housed for a portion of its length and having an opening 15 of sufficient size to permit insertion of the bolt 13.

The shaft 8 may be solid, but I prefer to use a pipe or tube for reasons hereinafter stated. The tightener is placed upon the shaft 8, before the latter is secured to the frame 1, and the opening 15 is alined with the aperture in the shaft 8 through which the bolt 13 is to pass; the bolt 13 is then inserted through the opening 15, the aperture if a solid shaft is used, and apertures opposite each other in a tubular shaft, and projects a sufficient distance through the slot 12 to provide for a nut 16 on its threaded end. On the bolt 13 between the nut 16 and the sleeve 9 I employ a washer 17 to provide a broader contact with the sleeve 9 than the nut 16 will give.

Before the nut 13 is turned to hold the parts named together it will be seen that the tightener can be turned on the shaft 8 to various positions limited only by the lengths of the slots 12 and 14; the head of the bolt 13, when the tightener is moved in one direction, being housed in the covered portion of the slot 14, and when the desired position of the tightener is attained so that the roller 11 rests against the chain with sufficient pressure to take up any slack thereon, the sleeve and shaft are clamped securely together by turning the nut 16 in the proper direction.

As before stated I prefer to employ, a tubular shaft 8, as shown, so that when the latter and the sleeve 9 are drawn together, a continued turning of the nut 16 will cause a lateral expansion of the tubular shaft 8, the diameter of the opening through the sleeve 9 being greater than the diameter of the tubular shaft 8, room for expansion of the latter is provided for and the tightener is rigidly held in any of its various positions of adjustment. It will be noted that the bolt 13 operates exteriorly against the sleeve 9 at only one point in the circumference thereof, the head of the bolt being in contact with the shaft 8 only.

What I claim is—

1. A chain tightener including a sleeve mounted on a shaft and turnable thereon to varying positions, an arm on said sleeve carrying a roller, and a bolt extending through said sleeve and shaft and adapted to hold the sleeve rigid with the shaft.

2. A chain tightener including a sleeve mounted on a shaft and turnable thereon to varying positions, an arm on said sleeve carrying a roller, said sleeve having diametrically opposite slots, and a bolt extending through said slots and shaft and adapted to hold the sleeve rigid with the shaft.

3. A chain tightener including a sleeve mounted on a shaft and turnable thereon to varying positions, an arm on said sleeve movable therewith and carrying a roller, said sleeve having diametrically opposite slots, and a bolt extending through said slots and shaft and operative to draw one side of said sleeve and the shaft together and hold them in rigid contact.

4. A chain tightener including a sleeve mounted on a shaft and turnable thereon to varying positions, an arm on said sleeve movable therewith and carrying a roller, said sleeve having diametrically opposite slots, and a bolt extending through said slots and the shaft and operative through one of said slots only to draw one side of the sleeve and the shaft together and hold them in rigid contact.

5. A chain tightener including a sleeve mounted on a rigid shaft and turnable thereon to varying positions, an arm on said sleeve movable therewith and carrying a roller, said sleeve having diametrically opposite slots, and a bolt extending through said slots and the shaft and operative through one of said slots only to draw one side of the sleeve and the shaft together and hold them in rigid contact.

6. A chain tightener including a sleeve mounted on a tubular shaft and turnable thereon to varying positions, an arm on said sleeve movable therewith and carrying a roller, said sleeve having diametrically opposite slots, and a bolt extending through said slots and the shaft and operative to expand the shaft laterally against the sleeve and to hold the latter and the shaft rigidly together.

7. A chain tightener including a sleeve mounted on a tubular shaft and turnable thereon to varying positions, the shaft having a smaller diameter than the interior of the sleeve to provide a space between the shaft and the sleeve, an arm on said sleeve movable therewith and carrying a roller, said sleeve having diametrically opposite slots, and a bolt extending through said slots and the shaft and operative to expand the shaft laterally against the sleeve and to hold the latter and the shaft rigidly together.

In testimony whereof I affix my signature in presence of two witnesses.

THOMAS S. COURTNEY.

Witnesses:
  JOE BARTHOLOMEW,
  G. L. LINDSTEDT.

Copies of this patent may be obtained for five cents each, by addressing the "Commissioner of Patents, Washington, D. C."